(12) United States Patent
Gabl

(10) Patent No.: US 6,920,983 B2
(45) Date of Patent: Jul. 26, 2005

(54) DEVICE FOR SEPARATING SOLIDS FROM LIQUIDS BY MEANS OF FLOTATION

(75) Inventor: Helmuth Gabl, Graz (AT)

(73) Assignee: Andritz AG, Graz (AU)

( * ) Notice: Subject to any disclaimer, the term of this patent is extended or adjusted under 35 U.S.C. 154(b) by 0 days.

(21) Appl. No.: 10/389,460

(22) Filed: Mar. 14, 2003

(65) Prior Publication Data

US 2003/0209471 A1 Nov. 13, 2003

(30) Foreign Application Priority Data

Mar. 27, 2002 (AT) .............................. 479/2002

(51) Int. Cl.[7] .............................. B03D 1/24; C02F 1/24; D21B 1/32
(52) U.S. Cl. .................. 209/170; 210/221.2; 162/4; 261/76; 261/77; 261/123; 261/124; 261/DIG. 75
(58) Field of Search ................................ 209/170, 168; 210/221.2; 162/4; 261/76, 77, 123, 124, DIG. 75

(56) References Cited

U.S. PATENT DOCUMENTS

| | | | | |
|---|---|---|---|---|
| 3,400,818 A | * | 9/1968 | Tarjan | ........................ 209/170 |
| 4,220,612 A | * | 9/1980 | Degner et al. | ................. 261/76 |
| 4,226,706 A | * | 10/1980 | Degner et al. | .............. 209/170 |
| 4,477,341 A | * | 10/1984 | Schweiss et al. | ........... 209/170 |
| 4,613,431 A | * | 9/1986 | Miller | ........................ 209/169 |
| 4,726,897 A | * | 2/1988 | Schweiss et al. | ........... 209/170 |
| 6,585,854 B2 | * | 7/2003 | Scherzinger et al. | .......... 162/55 |
| 2001/0025808 A1 | * | 10/2001 | Scherzinger et al. | ........ 209/168 |

FOREIGN PATENT DOCUMENTS

| | | | | |
|---|---|---|---|---|
| AT | 408 957 B | | 4/2002 | |
| DE | 3634903 A1 | * | 4/1988 | ............ B03D/1/24 |
| DE | 41 16 916 A1 | | 12/1992 | |
| EP | 0 211 834 B1 | | 12/1988 | |

* cited by examiner

Primary Examiner—Thomas M. Lithgow
(74) Attorney, Agent, or Firm—Alix, Yale & Ristas, LLP

(57) ABSTRACT

The invention relates to a device for separating solids from liquids by means of flotation, particularly for separating impurities and ink particles from fibre suspensions, with several injectors 10, which are provided inside a flotation cell 1. It is mainly characterised by the injectors 10 being arranged in one row.

17 Claims, 6 Drawing Sheets

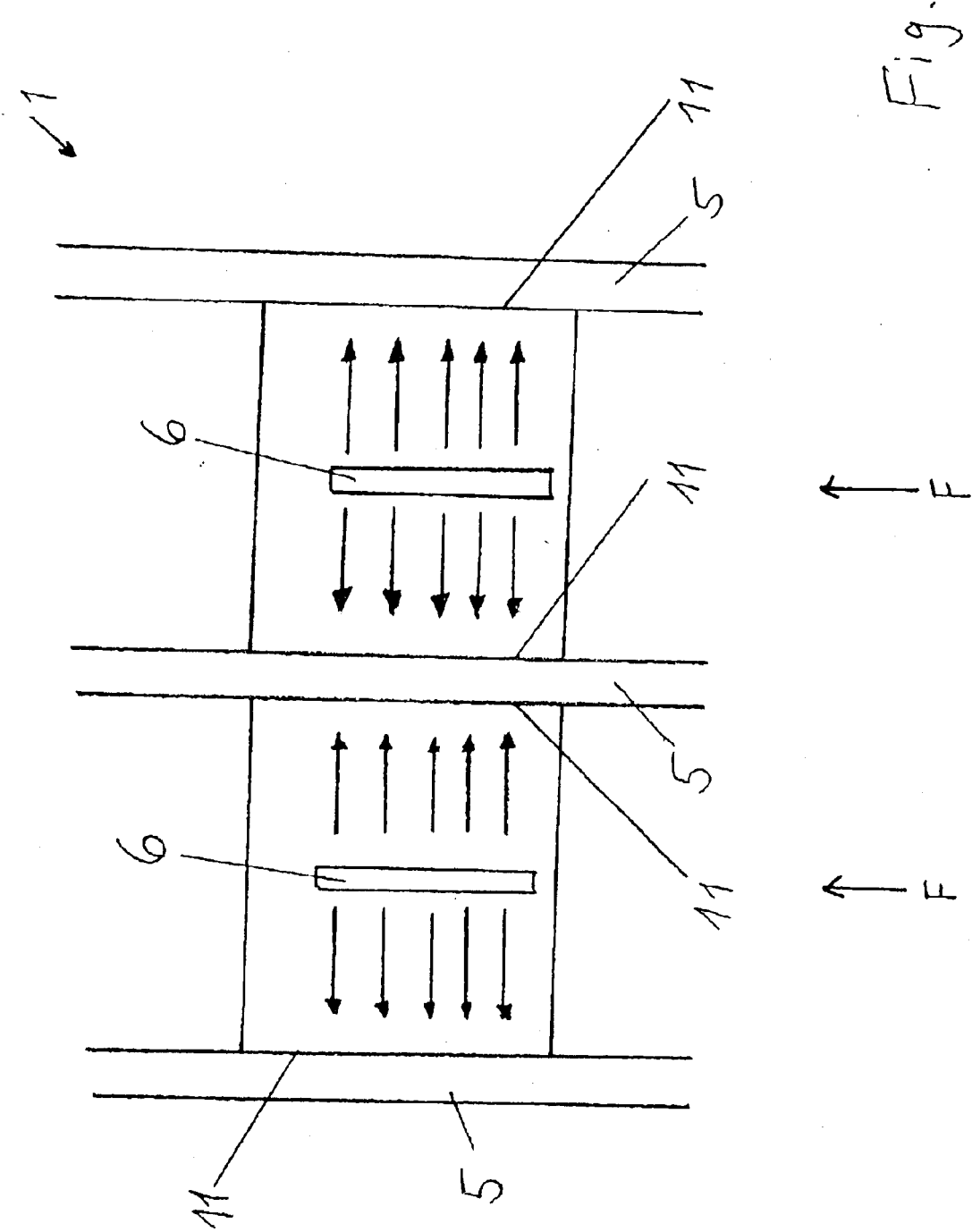

DEVICE FOR SEPARATING SOLIDS FROM LIQUIDS BY MEANS OF FLOTATION

BACKGROUND OF THE INVENTION

The invention relates to a device for separating solids from liquids by means of flotation, particularly for separating impurities and ink particles from fibre suspensions, with several injectors, which are provided inside a flotation cell.

Deinking flotation is a mechanical process for separating impurities and ink particles from fibre suspensions, particularly those produced in waste paper treatment. This process is linked to generating a suitable amount of gas bubbles over an appropriate range of bubble sizes. By changing the gas-liquid flows and the distribution of bubble sizes, ores, etc. can also be separated from low-grade, unusable material. A similar principle is applied in solid-liquid separation, e.g. in waste water.

Hydrophobic solids or such solids as ink particles or stickies (e.g. also coal as accept material) that have been made hydrophobic by applying surface-active substances are carried to the surface of the liquid by the gas bubbles adhering to them and can then be removed there as foam.

In the pulp and paper industry, this method of using self-priming injectors—mainly comprising a propulsion jet nozzle, mixing pipe or impulse exchange chamber and diffuser—has proved successful in generating gas bubbles and mixing them into the pulp suspension. These individual diffusers are usually assembled in small, round diffuser units (up to 12 individual diffusers). At the exit from the diffuser used for energy recovery a fibre stock bubble dispersion forms.

Processes of this type are known in numerous geometric modifications, e.g. from DE 41 16 916 C2, EP 0 211 834 B1 or AT 408 957, and have reached a high technical standard. Nevertheless, two disadvantages arise when using this process in large-scale industrial applications:

The suction effect of the known diffuser units suffers negative influence if there are eight injectors per unit or more because some of the injectors on the inside have a shorter supply of gas due to the injectors surrounding them. As a result of this short supply, there is a lower overall gas loading, which can lead to the propulsion jet being scattered. This reduces the operating reliability and/or the desired distribution of bubble sizes widens, which leads to a drop in efficiency in selective flotation or to higher losses.

SUMMARY OF THE INVENTION

The aim of the invention is thus to put together flotation cells that operate independently of the number of injectors, with the same suction effect and optimum bubble size distribution for each individual injector, for use in flotation, mainly in deinking and waste water applications.

The inventive concept is directed to several, e.g., at least three, individual injectors being arranged in one row. This provides efficient and easy gas access, which is present to the same extent for each individual nozzle. This concept applies to all injectors or nozzles regardless of the number of suction points.

Preferably, a plurality of parallel rows of at least three injectors each are arranged side-by-side in a block.

The invention permits a very favourable placement of the injectors within the flotation cell, distributed over the surface area, and thus a better overall flow pattern.

In an advantageous embodiment the rows are arranged in axial direction in the flotation cell. As a result, this achieves an even flow of foam over the entire cell length in the direction of the overflow weir. Furthermore, the accept or pulp to be aerated again can be removed by suction while largely avoiding short circuit flows.

In a flotation cell with a foam channel, the injector rows are arranged on the side of the flotation cell opposite the foam channel, which ensures complete flow through the entire flotation cell.

It has proved particularly advantageous if the injector rows are arranged in the middle of the flotation cell if there are two foam channels. This guarantees even loading of the overflow weirs and foam channels.

BRIEF DESCRIPTION OF THE DRAWINGS

The invention will now be described using the examples in the drawings, where.

DESCRIPTION OF THE PREFERRED EMBODIMENT

Figure 1:
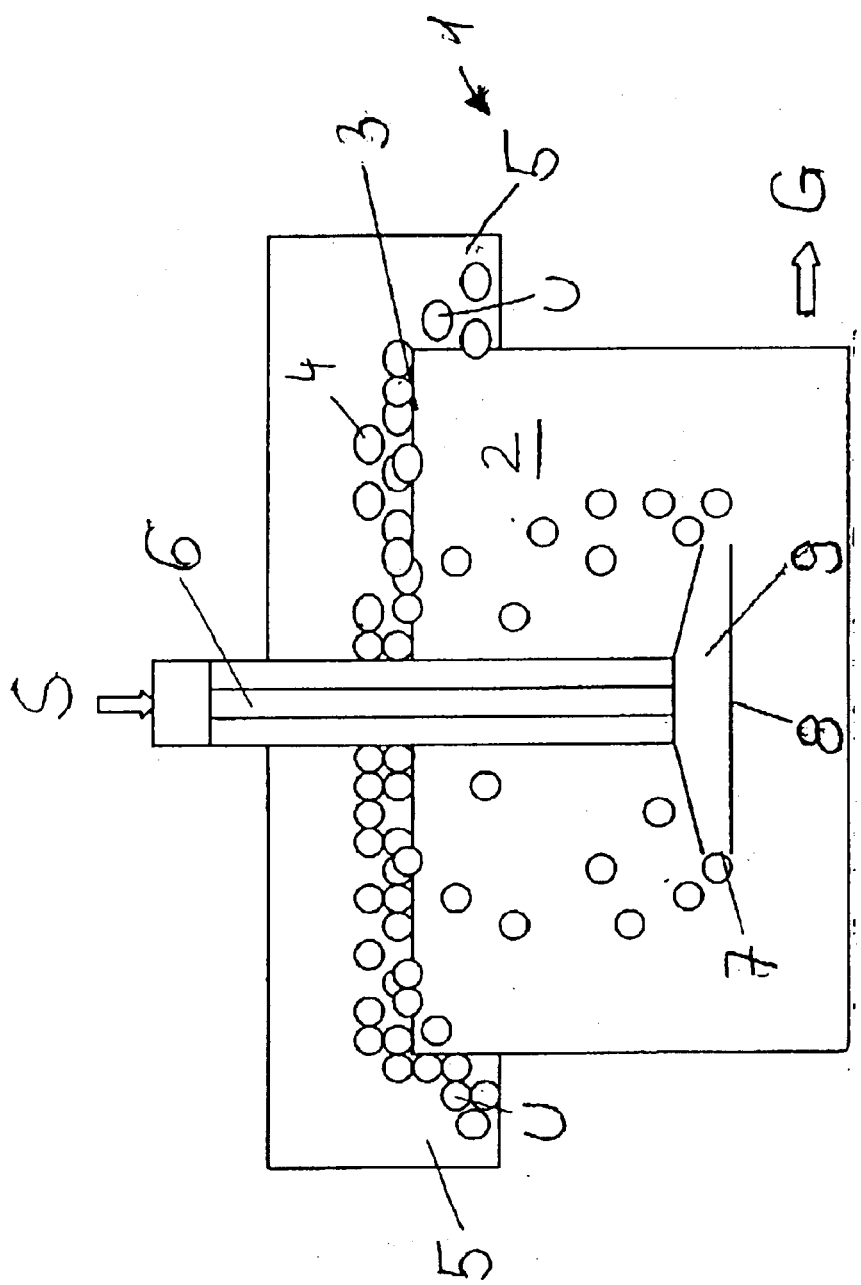
FIG. 1 is a diagram of how the invention is implemented.

FIG. 1 shows a diagram of a flotation unit in which the device according to the invention is installed. The flotation cell 1 is filled for the most part with suspension 2, on the surface 3 of which a layer of foam 4 forms, containing as large a portion as possible of the impurities and ink particles to be removed by flotation. The foam 4 can drain off through a foam channel 5 as overflow U. The fibre stock suspension S enters cell 1 through the nozzle unit (injector bundle) 6 and is discharged through diffuser 9. The dispersion of bubbles and fibre stock leaves the diffuser 9 after impinging on an impact plate 8. The bubbles adhere to the hydrophobic impurities and carry them to the surface 3. The cleaned suspension leaves the flotation cell as accept G.

Figure 2:
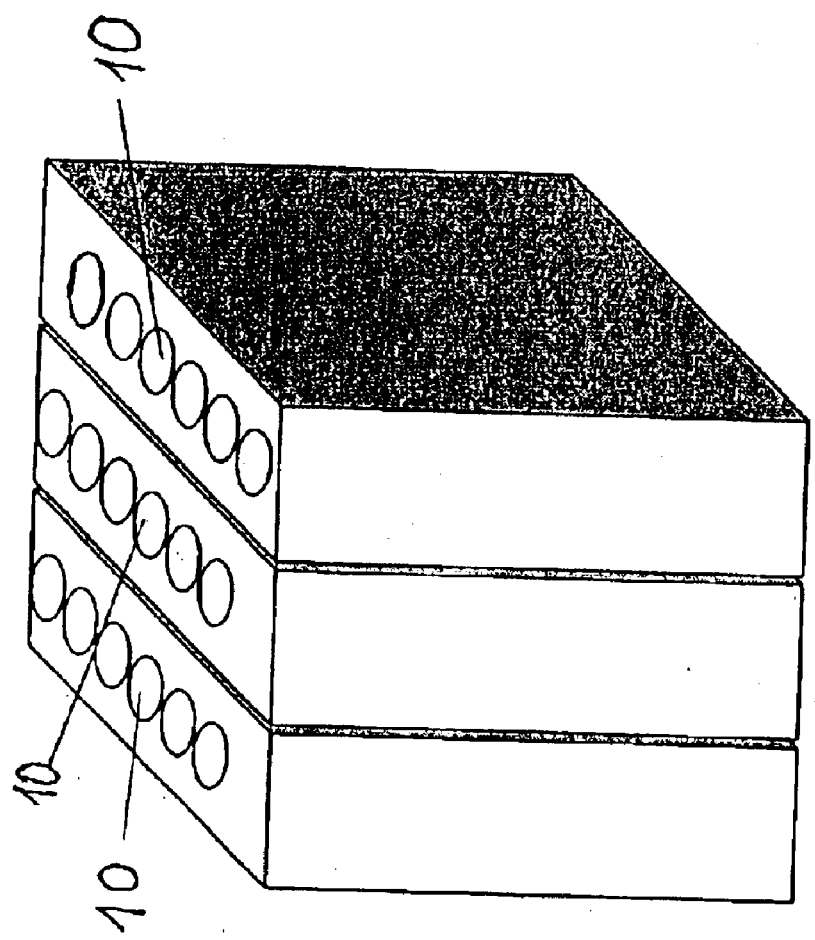
FIG. 2 shows a variant of the invention.

In FIG. 2 a diagram illustrates a possible variant of a line injector bundle 6 according to the invention, each with six individual injectors 10. In this case, the number of injectors can be varied and the requirements adapted hydraulically or according to production. If the air is offered to the open jet as evenly as possible from all sides at the lowest possible pressure loss in the first injector part, the line arrangement provides a correspondingly even distribution of bubbles in the blow-out sector of the injector impact plate 8 (FIG. 1). There is a much lower agglomerating tendency by the bubbles in the impact and blow-out sector of the injector units, and the narrow bubble size distribution generated can also be retained into the flotation sector thanks to the more favourable flow path after the mixing chamber, leading into the impact chamber and blow-out sector. Thus, overall aeration can be performed in a more favourable bubble size spectrum—avoiding fine bubbles but without the risk of larger bubbles agglomerating. The width of distribution and the selective setting for optimum coverage of the desired impurity grain size is thus maintained.

Figure 3:
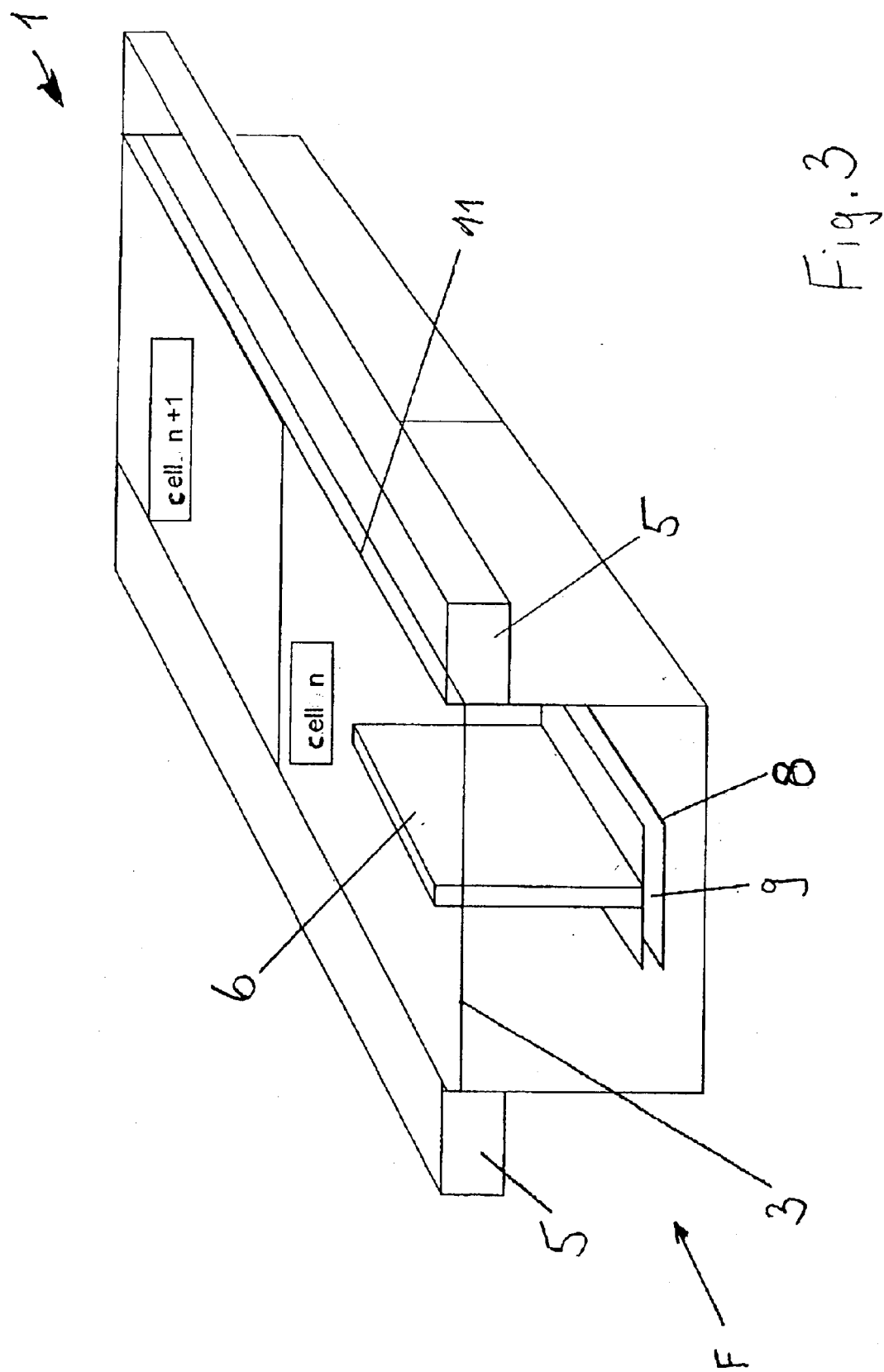
FIG. 3 illustrates how a variant of the invention is installed.

FIG. 3 illustrates installation of a device according to the invention as a line injector bundle 6 in a flotation unit 1, where the plant can be operated at any desired high throughput. The illustration shows two consecutive cells, n and n+1 arranged in the flow direction F of the suspension. By increasing the length of the overflow weirs 11, the specific overflow speed of the pulp to be floated can be reduced. In order to ensure even loading of the overflow weirs 11, the line injectors 6 are installed in a central position in relation to the suspension surface 3. The diffuser bundles 6 can be arranged such that the suspension flows into the flotation chamber from above, from the side, or from below. (It should be understood that reference to "diffuser bundles" includes the associated impact plate and diffuser structure).

Figure 4B:
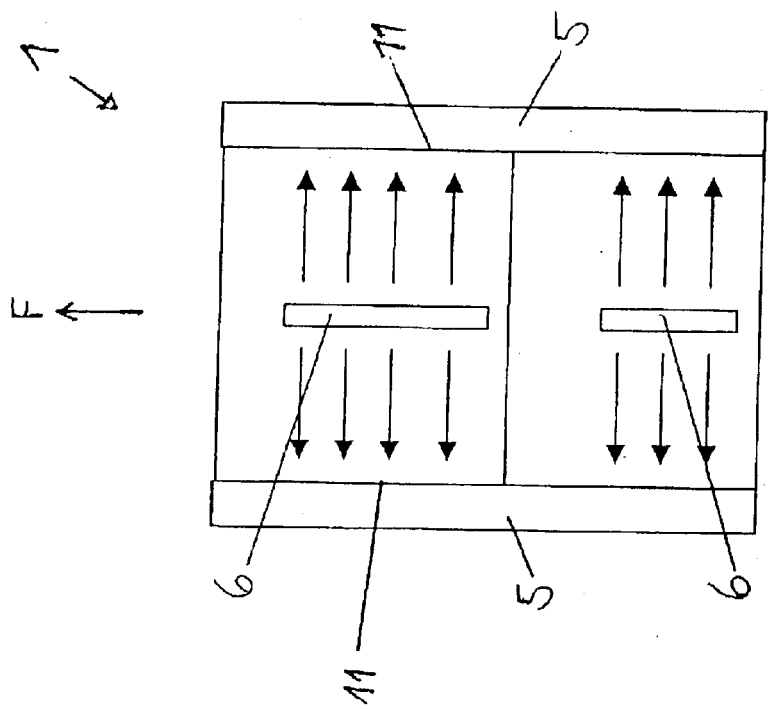
FIG. 4a shows a flotation cell embodiment according to the invention with one foam channel, FIG. 4b a flotation cell embodiment according to the invention with two foam channels, and FIG. 4c an embodiment of a flotation cell according to the invention with three foam channels.
Figure 4A:
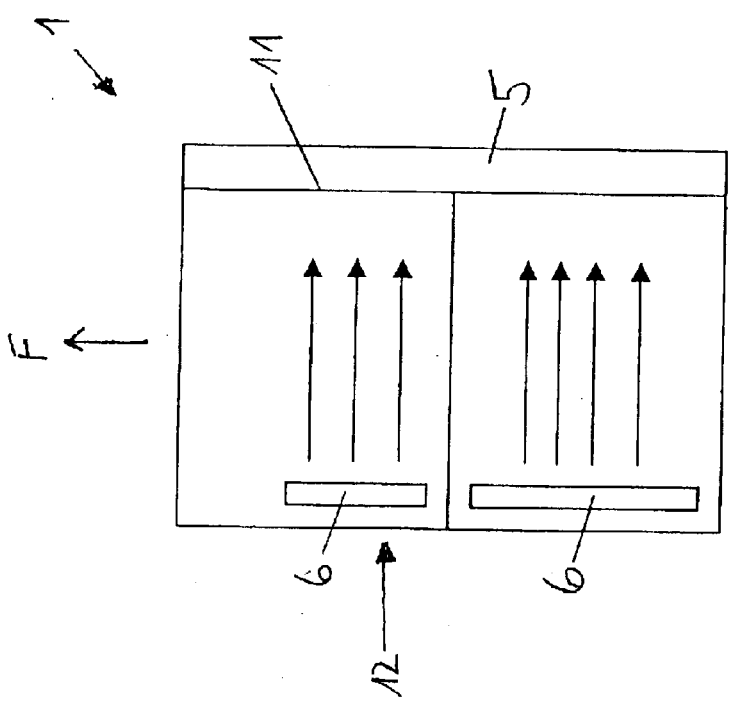

FIGS. 4*a* and *b* show a horizontal projection of two consecutive cells arranged in axial flow direction F in each case, with different arrangements of injector blocks 6. Aligning the module diffusers in the axial direction requires on the one hand an even flow of foam over the entire cell length towards the overflow weir 11, and on the other hand, the accept or the stock to be aerated again can be removed by suction while largely avoiding short-circuit flows. In this way the fibre stock losses can be reduced. The device according to the invention is also capable of introducing more air and thus improves removal of impurities. FIG. 4*a* shows a flotation cell 1 with a foam channel 5, where the diffuser blocks 6 are arranged here at the side 12 opposite to and facing the overflow channel 5. In flotation cells 1 with two foam channels 5, as shown in FIG. 4*b*, the diffuser blocks 6 are arranged in the middle so that there is an even flow of foam on all sides and with short flow paths. The variant in FIG. 4*c* shows two parallel flotation cells which have three foam channels 5, one of which is shared, where the two cells can also be mounted one behind the other, however this is used preferably to increase the throughput as a parallel arrangement.

Figure 5:
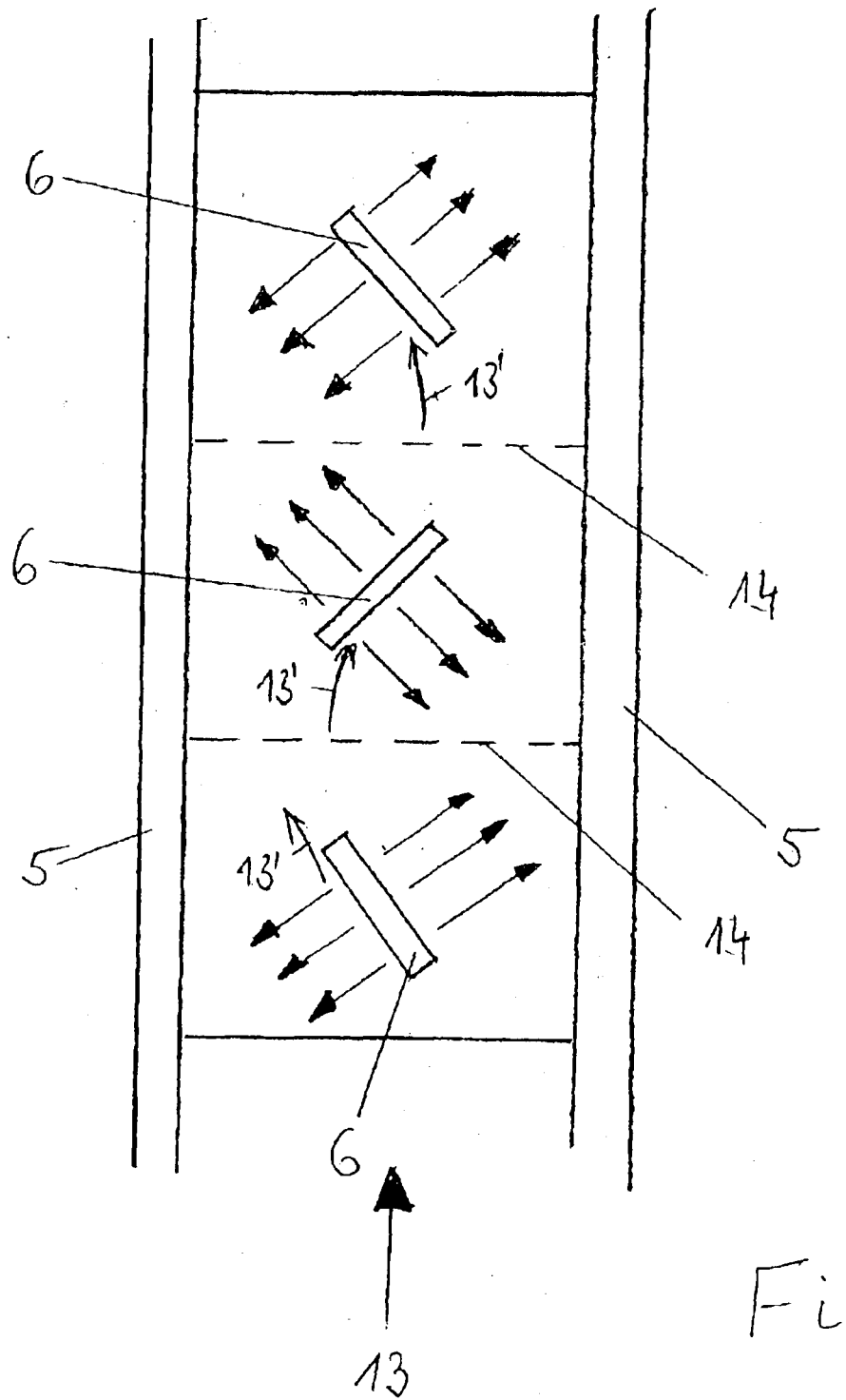
FIG. 5 shows a further embodiment according to the invention.

FIG. 5 shows an oblique arrangement of the injector blocks 6 in a way that the flow 13 of suspension through the flotation cells is deflected through the injector blocks 6 in the direction 13', which thus extends the flow path and with it, the retention time. The oblique orientation of each block in consecutive cells preferably alternates with respect to the direction of suspension flow. Here, one or more injector blocks 6 can be arranged in one flotation cell 1. In FIG. 5, the broken line 14 indicates that it is possible to divide individual flotation cells.

What is claimed is:

1. Device for separating solids from liquids in a suspension by means of flotation, the device comprising at least one flotation cell defining a flow direction and including a line diffuser bundle consisting essentially of firstly, at least three injectors aligned in a row to form a line in the flow direction and secondly a single substantially rectangular shaped impact plate and diffuser structure positioned to distribute the discharge from said injectors into the flotation cell.

2. Device according to claim 1, wherein said line diffuser bundle includes a plurality of parallel rows of at least three injectors each are arranged side-by-side in a block.

3. Device according to claim 1, wherein the flotation cell has one foam channel on one side of the cell and the line diffuser bundle is arranged on the side of the flotation cell opposite the foam channel.

4. Device according to claim 1, wherein the flotation cell has a plurality of foam channels and the line diffuser bundle is arranged in the middle of the flotation cell.

5. Device for separating impurities from a fibre suspension, the device comprising at least one flotation cell defining a flow direction and including a line diffuser bundle consisting essentially of firstly, at least three injectors aligned in a row to form a line and secondly, a single substantially rectangular shaped impact plate and diffuser structure positioned to distribute the discharge from the injectors into the flotation cell.

6. Device according to claim 5, wherein said line diffuser bundle includes a plurality of parallel rows of at least three injectors each are arranged side-by-side in a block.

7. Device according to claim 6, wherein the line diffuser bundle is located inside the flotation cell at an oblique angle to the flow of suspension.

8. Device according to claim 6, wherein the rows are arranged in the flow direction of the suspension through the flotation cell.

9. Device according to claim 8, wherein each line diffuser bundle has three parallel rows.

10. Device according to claim 5, wherein a plurality of cells are arranged in the direction of suspension flow, each cell having at least one line diffuser bundle with said row of injectors.

11. Device according to claim 10, wherein each line diffuser bundle is aligned with a line diffuser bundle in another cell.

12. Device according to claim 6, wherein a plurality of cells are arranged in the direction of suspension flow, each cell having one of said line diffuser bundles substantially centred within the cell and oriented obliquely to the direction of suspension flow.

13. Device according to claim 12, wherein the oblique orientation of each line diffuser bundle in consecutive cells, alternates with respect to the direction of suspension flow.

14. Device according to claim 6, wherein a plurality of cells are arranged in the direction of suspension flow, each cell having one said line diffuser bundles aligned with a line diffuser bundles of an adjacent cell.

15. Device according to claim 14, wherein the line diffuser bundles are aligned in the direction of suspension flow.

16. Device according to claim 5, wherein the flotation cell has one foam channel on one side of the cell and the line diffuser bundle is arranged on the side of the flotation cell opposite the foam channel.

17. Device according to claim 5, wherein the flotation cell has a plurality of foam channels and the line diffuser bundle is arranged in the middle of the flotation cell.

* * * * *